United States Patent [19]
Busch et al.

[11] 3,863,421
[45] Feb. 4, 1975

[54] SELF-RETAINED PANEL FASTENER ASSEMBLY

[75] Inventors: William J. Busch, Fountain Valley; Ervin J. Dey, Santa Fe Springs, both of Calif.

[73] Assignee: Standard Pressed Steel Co., Jenkintown, Pa.

[22] Filed: May 21, 1973

[21] Appl. No.: 362,174

[52] U.S. Cl. ............ 52/758 F, 403/407, 52/758 D, 85/8.8
[51] Int. Cl. ............................................ F16b 7/18
[58] Field of Search ..... 403/407; 151/69; 52/758 C, 52/758 D, 758 F; 85/8.8

[56] References Cited
UNITED STATES PATENTS

| | | |
|---|---|---|
| 3,180,388 | 4/1965 | Newcomer et al. .................. 151/69 |
| 3,221,589 | 12/1965 | VanderSande et al. ....... 151/41.7 X |
| 3,343,581 | 9/1967 | Martin et al. .......................... 151/69 |
| 3,503,431 | 3/1970 | Villo et al. .......................... 85/8.8 X |

*Primary Examiner*—Jordan Franklin
*Assistant Examiner*—Wayne L. Shedd

[57] ABSTRACT

A self-retained panel fastener assembly comprising a sleeve bolt carried by one workpiece and a barrel nut assembly carried by another workpiece. The sleeve bolt includes a shank having first and second portions interconnected by a groove and which carries a compressible retaining ring slidable along the groove and second shank portion. One end of the retaining ring includes means for aligning the workpieces during assembly of the sleeve bolt to the barrel nut assembly when assembling the joint.

14 Claims, 4 Drawing Figures

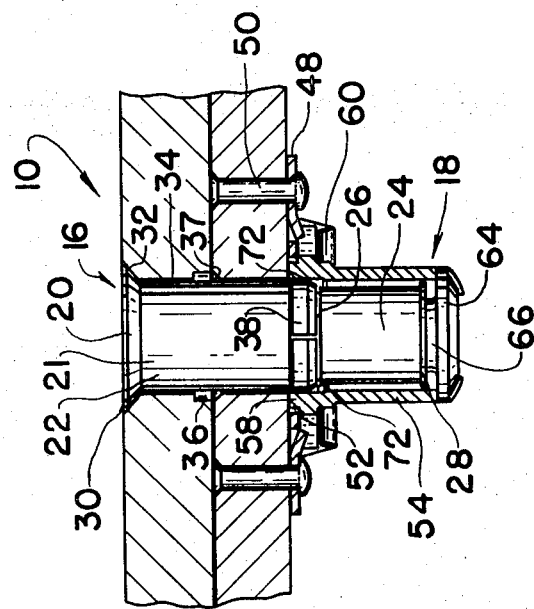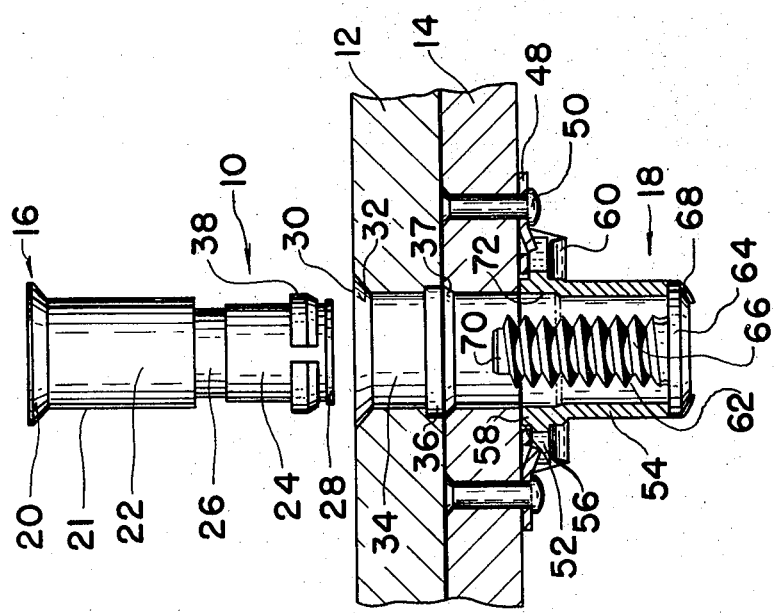

SELF-RETAINED PANEL FASTENER ASSEMBLY

The invention disclosed in this application relates to self retained panel fastener assemblies and, more particularly, to high strength retained panel fastener assemblies including means for aligning the workpieces comprising the joint in which it is used.

Various structural joints are formed by workpieces that are assembled and disassembled repeatedly so that the fasteners utilized to secure these joints must be capable of rapid assembly and disassembly. Because of this capability requirement, it is common to utilize self retained fastener assemblies, that is, fasteners that are carried by one of the workpieces, generally a removable workpiece, and which are presented from being disassembled from that workpiece. Thus, when the removable workpiece is removed, the fastener is retained with the workpiece and is ready for assembly to the other workpiece at a later time. It will be appreciated that in addition to facilitating the assembly and disassembly of the removable workpiece, the use of retained fastener assemblies prevents the fastener from being lost and allows for repeated use thereof.

Modern aircraft skins include many joints of the above type in the form of access panels which are frequently removed to provide access to various electrical, hydraulic and other equipment carried by an aircraft. Some of these access panels are removed each time the aircraft lands and, of course, are replaced prior to the aircraft's taking off. Accordingly, numerous self-retained panel fastener assemblies are used on modern aircraft.

Special requirements are imposed on the self retained fastener assemblies used in aircraft because these fasteners carry part of the load imposed on the skin of the aircraft, particularly in shear. Accordingly, one of the special requirements imposed is that the fastener have a high-strength. Another of the special requirements is that the fasteners should include some means for aligning the access panel with the underframe during assembly of the panel to the underframe. Misalignment of the access panel and its underframe generally occurs when the panel is removed because of the increased load carried by the underframe when the access panel is removed. The increased load causes a slight shifting of the underframe and, also, the removal of the load on the access panel causes its configuration to deform slightly. Thus, some misalignment between the access panel and its underframe occurs when the joint is to be assembled. It should be clear, that the requirement of an aligning means facilitates the quick and simple assembly of the joint.

None of the panel fastener assemblies available prior to this invention have concurrently and reliably satisfied the requirements set out above. For example, fastener assemblies of the type described in U.S. Pat. No. 2,991,816 currently enjoy usage in a variety of access panel to underframe joints. These assemblies include an internally threaded sleeve bolt having larger and smaller diameter outer surfaces interconnected by a tapered surface which acts to align the access panel and the underframe during assembly of the joint. A star shaped ring is carried on the outer surface of the sleeve bolt and normally sits on the smaller diameter surface where it acts to seecure the sleeve bolt against disassembly from the access panel. During assembly of the joint, the ring rides over the smaller diameter surface, the tapered surface, and the larger diameter surface where it is expanded into a counter bore in the access panel when the joint is assembled. When sealant is introduced around the hole on the underframe or adjacent the access panel, the ring could be maintained in the expanded position if the sealant cures in the counter bore. Thus, when removing the access panel it would be possible for the sleeve bolt to ride through the expanded ring and be removed from the access panel once the access panel is removed from the underframe. Even if the sealant does not cure in the counterbore, the ring is normally maintained in an expanded position and can lose some of its resiliency. In such an event, it is possible for the ring to fail and for the sleeve bolt to be removed inadvertently from the access panel. It can be seen, therefore, that retained fastener assemblies of this type are not totally reliable.

In addition, it should be noted that with present self-retained fastener assemblies, intentional removal of the sleeve bolt from the access panel requires prying or otherwise deforming the ring. In order to reuse the sleeve bolt, it is necessary to provide a new ring which may not be available in an airport where the aircraft is being serviced or if it is, can involve a time consuming assembly operation.

It is an object of this invention, therefore, to provide a reliable self-retained high strength panel fastener assembly that includes means for aligning the workpieces of a joint during the assembly of the joint.

It is another object of this invention to provide a reliable self-retained high strength panel fastener assembly that can be readily reused.

These and other objects of this invention are achieved by providing a sleeve bolt adapted to be carried by a first workpiece which may be an access panel and a barrel nut assembly carried by a second workpiece which may be an underframe. The sleeve bolt is provided with an internally threaded shank having first and second outer diameter portions interconnected by a groove. The first shank portion has a larger diameter than the second shank portion and the second shank portion, of course, has a larger diameter than the groove. Carried on the shank is a compressible retaining ring having an inner diameter just slightly larger than the second shank portion, but smaller than the first shank portion. One end of the retaining ring includes means for aligning the workpieces during assembly of the joint. During installation, the ring rides into the groove on the shank where it aligns the workpieces and is then compressed to allow the shank to be inserted through the second workpiece. When the joint is disassembled, however, the ring will ride along the second shank portion to an expanded position which prevents the sleeve bolt from being removed from the first workpiece.

A counterbore can be formed in the mating surface of the first and/or second workpieces so that when the joint is being disassembled the ring will automatically expand in the counterbore. By allowing the ring to expand during the disassembly of the joint, the ring will not inadvertently ride back through the first workpiece in a contracted condition allowing removal of the sleeve bolt therefrom.

In addition, a tool can be provided to compress the ring and allow removal of the sleeve bolt from the first workpiece when it is so desired.

For a better understanding of the present invention, together with other and further objects thereof, reference is made to the following description, taken in connection with the accompanying drawings, and its scope will be pointed out in the appended claims.

Referring to the drawings:

FIG. 1 is a view partly in section of a joint including a self-retained panel fastener assembly according to this invention prior to assembly;

FIG. 2 is a view similar to FIG. 1, but showing the joint in assembled condition;

Figure 3:
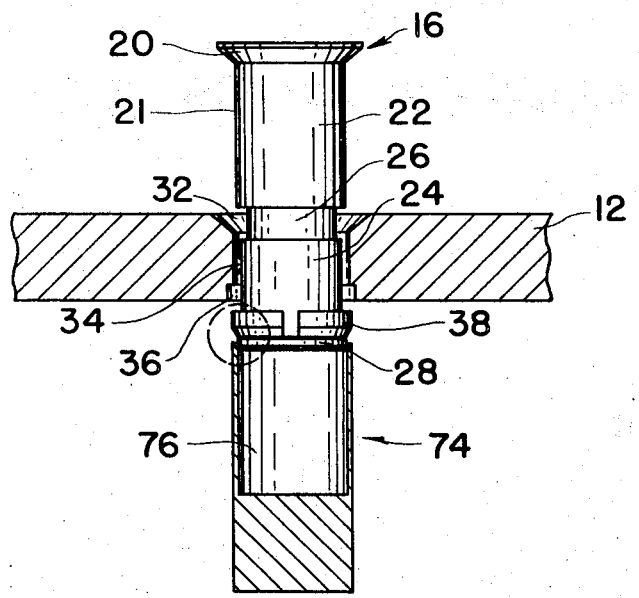
FIG. 3 is a view partly in section and illustrating a sleeve bolt assembly in accordance with this invention; and, FIG. 4 is an enlarged view of the encircled portion in FIG. 3.

In FIGS. 1 and 2 of the drawing, there is illustrated a joint assembly 10 comprising first and second workpieces 12 and 14, respectively, a sleeve bolt 16 and a barrel nut assembly 18. In a typical application of this invention, workpieces 12 and 14 may be an access panel and an underframe, respectively, but it should be understood that they may be structural members of any type. Sleeve bolt 16 comprises a head 20 of the countersink type having an internal wrenching recess (not shown) and a shank 21 extending axially therefrom. While not illustrated in the drawing, it should be noted that shank 21 is internally threaded in a conventional manner that is, a blind hole extends from the free end of the shank toward the head and its axial wall includes a thread configuration. Shank 21 comprises a first diameter portion 22, a second diameter portion 24 and an interconnecting groove portion 26. The diameter of shank portion 24 is less than that of shank portion 22 and, of course, groove 26 has a smaller diameter than shank portion 24. Formed at the free end of the shank is a tip portion 28 having a diameter greater than that of shank portion 24 but less than that of shank portion 22. An opening 30 is formed in workpiece 12 and includes a countersink 32 complimentary to that of head 20, a cylindrical portion 34 having a diameter just slightly greater than that of first shank portion 22 so that the shank portion of sleeve bolt 16 is freely slidable in the opening. If desired, the mating surface of workpiece 12 is formed with a counterbore 36 for a purpose which will be made clear hereinafter.

Carried on shank 21 of sleeve bolt 16 is a compressible retaining ring 38 having an internal diameter less than that of first shank portion 22 and just slightly greater than that of second shank portion 24. Accordingly, retaining ring 38 is slidable along second shank portion 24 and also groove portion 26 but cannot slide over shank portion 22. To keep retaining ring 38 on the shank, tip portion 28 has a diameter just slightly greater than that of shank portion 24 and the internal diameter of retaining ring 38, but less than that of shank portion 22.

Figure 4:
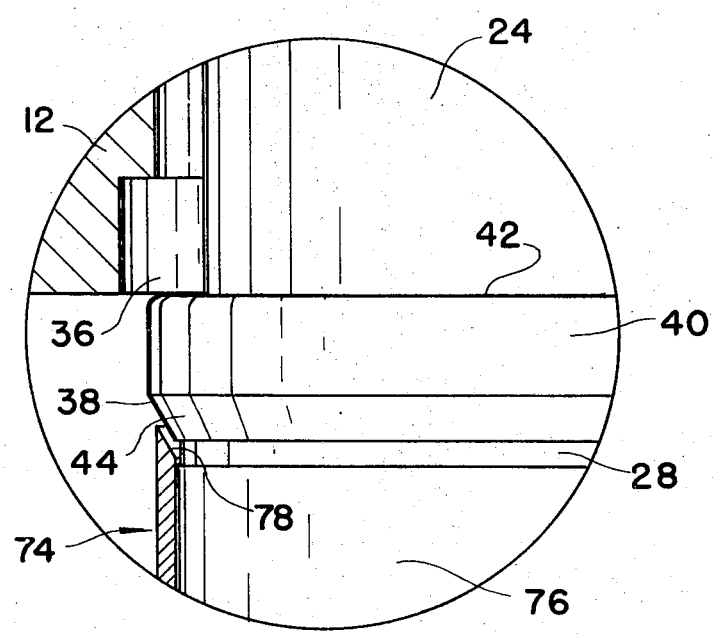

Referring to FIG. 4 where retaining ring 38 is illustrated on an enlarged scale, it can be seen that the retaining ring comprises an annular portion 40 having a finite axial length and formed with a radial wall 42 at the end closest to head 20. Extending from the other end of annular portion 40 is a frusto-conic surface portion 44 which, as will be more fully explained hereinafter, functions as an aligning means for workpieces 12 and 14 during the assembling of the joint. Frusto-conic surface 44 terminates at its free end with a radial surface having a diameter substantially equal to the diameter of tip portion 28 so that the frusto-conic surface extends radially beyond the tip portion. Retaining ring 38 is preferably a split ring member so that it can be compressed from its relaxed condition wherein the outer diameter of annular portion 40 is greater than that of the diameter of cylindrical opening 34 in workpiece 12, to a smaller diameter slightly smaller than that of cylindrical opening 34 so shank 21 can be inserted through opening 30.

As previously noted, barrel assembly 18 is carried by workpiece 14 and is adapted to cooperate with sleeve bolt 16 to secure the workpiece together. Formed in workpiece 14 is a generally cylindrical opening 46 having a diameter equal to that of cylindrical portion 34 of opening 30 in workpiece 12. A counterbore, preferably in the form of a countersink 37, is formed on the mating surface of panel 14 for a purpose to be explained hereinafter. It should be noted that barrel nut assembly 18 could be of any suitable type and that the assembly described herein is the preferred embodiment. A retaining plate member 48 is carried on the outer face of workpiece 14 by suitable rivets 50 or other retaining means. Plate member 48 is formed with a central opening 52 which is substantially larger in diameter than opening 46. A barrel member 54 is formed with a flange 56 extending radially around its outer diameter at a point spaced from the bearing surface end 38 of the barrel by a distance at least equal to the thickness of retaining plate 48. The outer diameter of bearing surface 58 is less than that of opening 52 whereby bearing surface 58 seats against the outer surface of workpiece 14. While any suitable mechanism can be utilized to secure barrel member 54 to retaining plate 48, the preferred embodiment utilizes a floating arrangement including tab members 60 bent downwardly from retaining plate 48 and inwardly across flange 56. The downwardly bent portions of tab members 60 limit movement of barrel nut 54 in one direction and suitable tabs (not shown) can be utilized to limit movement in the other or transverse direction. Carried on the free end of barrel member 54 is an externally threaded stud 62 having a head 64 and a threaded shank 66. Again, any suitable mechanism can be utilized to secure the stud to the barrel member and in the preferred embodiment illustrated herein a tab and slot arrangement 68 is utilized. In the embodiment illustrated herein, shank member 66 extends upwardly through barrel member 54 and terminates in a dog point 70 located slightly beyond the outer surface of workpiece 14 and into opening 46.

For purposes which will be explained hereinafter, the inner diameter of barrel member 54 includes a first portion extending from the free end toward bearing surface 58 and further includes an enlarged counterbore portion 72 adjacent the bearing surface having a diameter substantially equal to, but no greater than, the diameter of opening 46 in workpiece 14. Before describing the operation of the assembly described, one other relationship should be noted, that is, the axial length of shank portion 22 on sleeve bolt 16 should be equal to the thickness of workpieces 12 and 14 and the axial length of shank portion 24 is preferably at least equal to or slightly greater than the thickness of workpiece 14. The reason for these relationships will be made clear hereinafter.

Before securing panels 12 and 14 together it should be realized that it is first preferable to assemble sleeve bolt 16 with workpiece 12. Thus, shank 21 of sleeve bolt 16 is inserted through opening 30 in workpiece 12 from the outer surface thereof. When the shank is inserted, ring 38 in its relaxed condition will slide along shank portion 24 and into groove 26 with radial surface 42 bearing against the end of shank portion 22. At this point, frusto-conic surface 44 bears against the edge formed by countersink 32 and cylindrical portion 34 of opening 30 and is compressed to a diameter that allows insertion of shank 21 through opening 30. After the end face of shank portion 22 passes beyond cylindrical portion 34 ring 38 expands to its relaxed position. Since the outer diameter of annular portion 40 is greater than that of cylindrical portion 34, removal of sleeve bolt 16 from workpiece 12 is prevented. It should be clear that head portion 20 prevents the sleeve bolt from being withdrawn through the opening in the opposite direction.

Barrel nut assembly 18 has previously been secured to the outer surface of workpiece 14 by rivets 50 in a conventional manner. To secure workpieces 12 and 14 together, workpiece 12 is placed in overlying relationship with workpiece 14 so that opening 30 is generally aligned with opening 46. As the shank is inserted, retaining ring 38 will slide along shank portion 24 and into groove portion 26 with end face 42 bearing against the end of shank portion 22. Of course, if retaining ring 38 is already so located, the sliding action will not occur. Since shank portion 24 has an axial length at least equal to the thickness of workpiece 14 and since shank 66 terminates slightly beyond the outer surface of workpiece 14, the internal thread at the free end of the sleeve bolt will engage the end of threaded shank 66 of stud 62. At this point, torque will be applied to sleeve bolt 16 so that the threads in the sleeve bolt and on the stud will cooperate in a conventional manner. As torque is applied frusto-conic surface 44 on retaining ring 38 will engage the edge formed between opening 46 and countersink 37 and as the application of the torque continues, surface 44 will cause workpiece 14 to shift so that apertures 30 and 46 are aligned. The noted length of shank portions 24 and 66 are not necessary for this invention but it will be understood that threaded engagement of these shank portions should occur before surface 44 engages the edge between the opening and the countersink. As the application of the torque continues, retaining ring 38 will again be compressed to a diameter that allows it and shank portion 22 to pass through opening 46.

Finally, it should be noted that retaining ring 38 cannot be allowed to expand beyond outer surface of workpiece 14. If this should occur, retaining ring 38 will bear against the outer surface and disassembly of the joint would be impossible. One technique for preventing expansion of retaining ring 38 would be to make axial length of shank portion 22 somewhat smaller than the combined thickness of workpieces 12 and 14. Thus, some portion, preferably annular portion 40, of retaining ring 38 will be located in opening 46 and will thereby be maintained in a compressed condition. While this technique is generally satisfactory, it requires close dimensioning and tolerance control of shank portion 22 and, also, of ring 38. The preferred technique for preventing expansion of the ring involves enlarged counterbore 72 adjacent bearing surface 58 of barrel member 54. Since the diameter of counterbore 72 is not greater than the diameter of opening 46, retaining ring 38 is maintained in its compressed condition when it extends beyond outer surface of workpiece 14 allowing withdrawal of sleeve bolt 16 therethrough. It should be clear that by maintaining retaining ring 38 in a compressed condition, either by opening 46 or counterbore 72, a prevailing torque locking characteristic is provided without resorting to the use of expensive locking techniques. In its compressed condition, retaining ring 38 is tending to expand to its relaxed condition whereby a force is exerted between annular portion 40 and either opening 46 or counterbore 72.

At this point, it should be noted that counterbores 36 and 37 prevent the inadvertent withdrawal of sleeve bolt 16 through opening 30 when the joint is being disassembled. Because of the counterbores, upon disassembly of the joint, retaining ring 38 can expand to its relaxed condition adjacent to the mating surfaces of workpieces 12 and 14 and cannot be withdrawn from workpiece 14 in a compressed condition and then inadvertently through workpiece 12.

Referring to FIG. 4, the technique for removing sleeve bolt 16 from workpiece 12 is illustrated. A removal tool 74 includes a blind opening 76 formed therein with an inner diameter generally equal to the diameter of an intermediate portion of frusto-conic surface 44 when the ring is in its relaxed condition. By pushing on the closed end of tool 74 when end face 78 of the tool is located against frusto-conic surface 44, retaining ring 38 will be compressed and allow removal of sleeve bolt 16 through opening 30 and in workpiece 12.

While there has been described what is at present considered to be the preferred embodiment of the invention, it will be obvious to those skilled in the art that various changes and modifications may be made therein without departing from the invention and it is therefore aimed to cover such changes and modifications that fall within the true spirit and scope of the invention.

We claim:

1. A self-retained panel fastener comprising a head and shank extending therefrom, said shank being formed with a thread configuration and being adapted to extend through aligned openings in a stack of workpieces, said shank including a first portion adjacent said head and a second portion spaced from said first portion by a groove, said second portion having a diameter smaller than the diameter of said first portion, and a compressible retaining ring on said shank portion, said ring having an inner-diameter slightly larger than that of said second shank portion and smaller than that of said first shank portion whereby said ring is slidable along said second shank portion to seat on said groove, said shank including radially projecting means adjacent the free end thereof for retaining said ring on said shank, said ring further having an outer-diameter larger than that of said first shank portion when the ring is uncompressed, said ring being compressible in said groove so that said outer-diameter is substantially equal to that of said first shank portion whereby said shank can be inserted through said openings in said workpieces when said ring is compressed, said ring further having aligning means formed thereon for aligning the workpieces during insertion of said shank through said openings in said workpieces.

2. A self-retained panel fastener in accordance with claim 1 wherein said aligning means comprises an inclined surface extending inwardly from the outer diameter of said retaining ring intermediate the ends thereof toward the end of said ring adjacent said second portion when said ring is adjacent said groove.

3. A self-retained fastener in accordance with claim 1 wherein said radially projecting means comprises a tip formed at the free end of said second portion, said tip extending in a radial direction and having an outer diameter greater than that of said second shank portion and less than that of said first shank portion.

4. A self-retained panel fastener in accordance with claim 1 wherein said retaining ring includes an annular portion having a finite axial length.

5. A self-retained panel fastener in accordance with claim 4 wherein said aligning means comprises an inclined surface extending from one end of said annular portion toward the free end of said shank, the largest diameter of said inclined surface being adjacent said annular portion and the smallest diameter of said inclined surface being adjacent the free end thereof.

6. A self-retained panel fastener in accordance with claim 1 wherein said shank is internally threaded.

7. A joint assembly comprising a plurality of workpieces having openings extending therethrough, a barrel nut assembly non-rotatably carried on the outer surface of one of said workpieces said barrel nut assembly including a threaded portion generally aligned with the opening in said one workpiece and having a free end generally adjacent said outer surface of said one workpiece, another of said workpieces carrying a self-retained sleeve bolt including a head and a shank extending through the opening in said another workpiece, said shank including first and second portions spaced apart by a groove, said first portion having a length at least equal to the thickness of said another workpiece being located adjacent said head and having a diameter slightly smaller than the smallest diameter of said openings in said workpieces, said second portion having a diameter smaller than that of said first portion and carrying a compressible retaining ring thereon, said ring having an outer diameter larger than that of said first portion and the opening in said another workpiece said shank including radially projecting means adjacent the free end thereof for retaining said ring on said shank whereby said sleeve bolt is retained with said another workpiece and an inner diameter smaller than that of said first portion and slightly larger than that of said second portion, during assembly of said workpieces said ring being slidable along said second portion and compressible in said groove by said one workpiece so that said outer diameter is no greater than that of said opening in said one workpiece whereby said shank may be inserted therethrough, said ring further having aligning means formed thereon for aligning said openings in said workpieces when said workpieces are being assembled.

8. A joint assembly in accordance with claim 7 wherein said shank is internally threaded and the free end of said stud is located such that during assembly of said joint said shank and said stud are in threaded engagement before said aligning means engages said one of said workpieces and the back end of said ring engages said first portion of said shank.

9. A joint assembly in accordance with claim 7 wherein said openings through said workpieces include a counterbore configuration adjacent the mating surfaces thereof, whereby said retaining ring can expand in said counterbore configuration when said sleeve bolt is being retracted from said one of said workpieces thereby preventing retraction of said sleeve bolt through said another of said workpieces.

10. A joint assembly in accordance with claim 7 wherein said aligning means comprises an inclined surface extending downwardly from the outer diameter of said retaining ring intermediate the ends thereof toward the end of said ring adjacent said one of said workpieces.

11. A joint assembly in accordance with claim 7 wherein said radially projecting means comprises a tip formed at the free end of said second portion, said tip extending in a radial direction and having an outer diameter greater than that of said second shank portion and less than that of said first shank portion.

12. A joint assembly in accordance with claim 7 wherein said retaining ring includes a generally annular portion having a finite axial length.

13. A joint assembly in accordance with claim 12 wherein said aligning means comprises an inclined surface extending inwardly from the end of said annular portion adjacent the free end of said shank, the largest diameter of said inclined surface being adjacent said end of said annular portion and the smallest diameter of said inclined surface being adjacent the free end thereof.

14. A joint assembly in accordance with claim 7 wherein said first portion of said shank has an axial length greater than that of the opening in said another workpiece whereby said retaining ring is spaced from adjacent faces of said workpieces when said joint is assembled.

* * * * *